United States Patent
Haider et al.

(10) Patent No.: US 9,885,239 B2
(45) Date of Patent: Feb. 6, 2018

(54) METHOD AND SYSTEM FOR GENERATING ENERGY DURING THE EXPANSION OF NATURAL PROCESS GAS

(71) Applicant: BASF SE, Ludwigshafen (DE)

(72) Inventors: Mirko Haider, Maxdorf (DE); Thomas Brostean, Neustadt (DE)

(73) Assignee: BASF SE, Ludwigshafen (DE)

( * ) Notice: Subject to any disclaimer, the term of this patent is extended or adjusted under 35 U.S.C. 154(b) by 150 days.

(21) Appl. No.: 14/427,155

(22) PCT Filed: Sep. 17, 2013

(86) PCT No.: PCT/EP2013/069199
§ 371 (c)(1),
(2) Date: Mar. 10, 2015

(87) PCT Pub. No.: WO2014/044649
PCT Pub. Date: Mar. 27, 2014

(65) Prior Publication Data
US 2015/0233247 A1  Aug. 20, 2015

(30) Foreign Application Priority Data

Sep. 18, 2012 (EP) .................... 12184840

(51) Int. Cl.
*F01K 23/10* (2006.01)
*F01K 17/04* (2006.01)
(Continued)

(52) U.S. Cl.
CPC ............. *F01B 31/08* (2013.01); *F01B 23/10* (2013.01); *F01K 17/04* (2013.01); *F01K 25/10* (2013.01);
(Continued)

(58) Field of Classification Search
CPC .................... F17D 1/065; F17D 1/075; F01K 25/00–25/14
(Continued)

(56) References Cited

U.S. PATENT DOCUMENTS 3,154,928 A * 11/1964 Harmens .................. F17C 9/04
60/641.1
3,998,059 A * 12/1976 Randell .................... F01K 3/10
60/653
(Continued)

FOREIGN PATENT DOCUMENTS

DE 10 2006 046 246    2/2008
EP    0 004 398       10/1979
(Continued)

OTHER PUBLICATIONS

International Search Report dated Feb. 5, 2014 in PCT/EP13/069199 Filed Sep. 17, 2013.
(Continued)

*Primary Examiner* — Laert Dounis
(74) *Attorney, Agent, or Firm* — Oblon, McClelland, Maier & Neustadt, L.L.P.

(57) ABSTRACT

Provided is a method for energy recuperation in the expansion of processed natural gas before the delivery of the latter to an acetylene production plant (H). The method includes delivery of heated processed natural gas to an expansion device and expansion of the processed natural gas in the expansion device to a pressure of 2 bar to 8 bar. The expansion device is a piston expansion machine which is operated by the expansion of the processed natural gas and which generates energy. Also provided is a plant for energy recuperation in the expansion of processed natural gas.

16 Claims, 1 Drawing Sheet

(51) Int. Cl.
*F01B 31/08* (2006.01)
*F01B 23/10* (2006.01)
*F01K 25/10* (2006.01)
*F01K 25/14* (2006.01)
*F17C 9/04* (2006.01)
*F17D 1/02* (2006.01)

(52) U.S. Cl.
CPC .............. *F01K 25/14* (2013.01); *F17C 9/04* (2013.01); *F17D 1/02* (2013.01)

(58) Field of Classification Search
USPC .......................... 60/648, 650, 651, 671, 682
See application file for complete search history.

(56) References Cited

U.S. PATENT DOCUMENTS

| | | | |
|---|---|---|---|
| 4,132,065 A | 1/1979 | McGann | |
| 4,693,072 A * | 9/1987 | McLean | F01K 9/003 60/39.182 |
| 4,920,749 A * | 5/1990 | Letarte | F01K 25/14 60/648 |
| 4,995,234 A * | 2/1991 | Kooy | F01K 25/10 60/648 |
| 5,628,191 A | 5/1997 | Kueck et al. | |
| 2004/0128975 A1 | 7/2004 | Viteri | |
| 2005/0065391 A1 | 3/2005 | Gattis et al. | |
| 2007/0191655 A1 | 8/2007 | Gattis et al. | |
| 2010/0167134 A1 | 7/2010 | Gattis et al. | |
| 2010/0167135 A1 | 7/2010 | Gattis et al. | |
| 2010/0167136 A1 | 7/2010 | Gattis et al. | |
| 2010/0167137 A1 | 7/2010 | Gattis et al. | |
| 2010/0167138 A1 | 7/2010 | Gattis et al. | |
| 2010/0167139 A1 | 7/2010 | Gattis et al. | |
| 2010/0252028 A1 * | 10/2010 | Mierisch | F01K 3/12 126/640 |
| 2012/0038172 A1 * | 2/2012 | Greenberg | F01K 25/10 290/1 R |

FOREIGN PATENT DOCUMENTS

| | | | |
|---|---|---|---|
| EP | 0 670 957 | | 7/1996 |
| JP | 57056614 A | * | 4/1982 |
| RU | 2 013 615 C1 | | 5/1994 |
| RU | 101 095 U1 | | 1/2001 |
| WO | 2004 046523 | | 6/2004 |

OTHER PUBLICATIONS

Search Report dated Sep. 21, 2017 issued in corresponding Russian patent application RU2015114341.

* cited by examiner

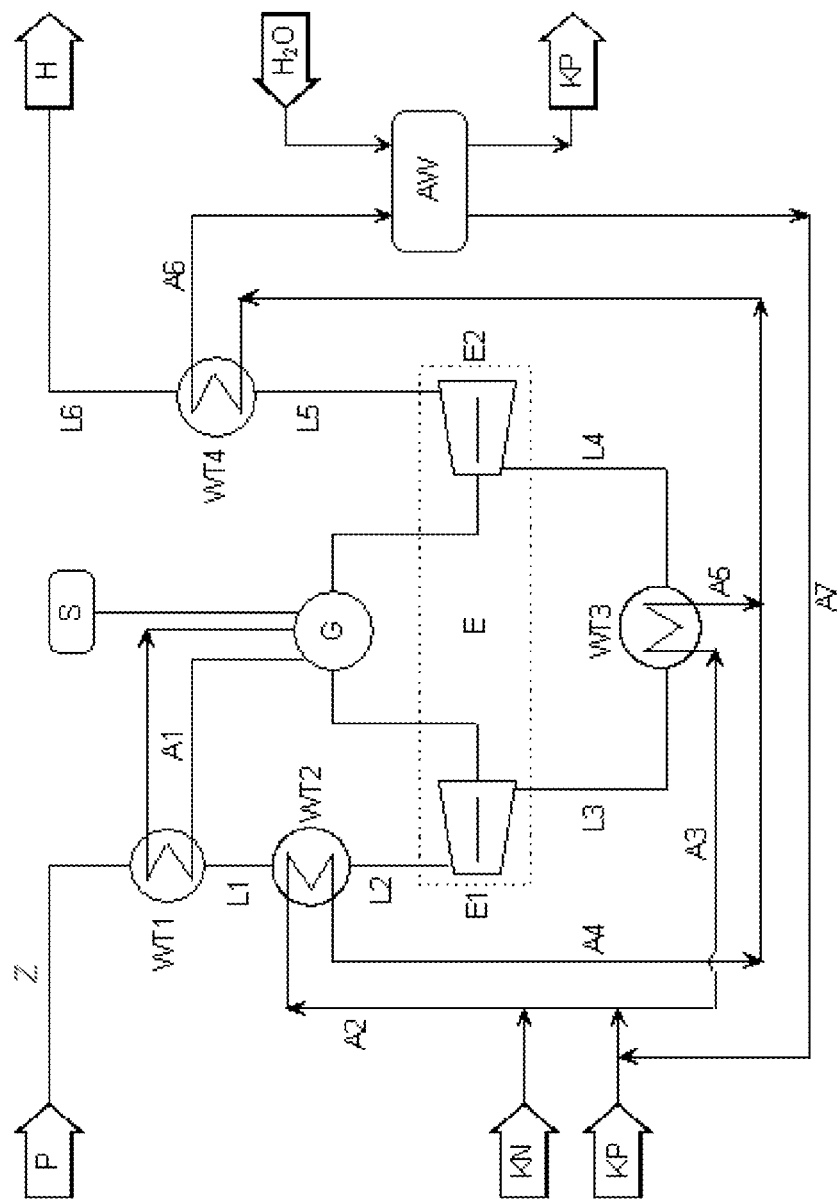

METHOD AND SYSTEM FOR GENERATING ENERGY DURING THE EXPANSION OF NATURAL PROCESS GAS

The present invention relates to a method and a plant for energy recuperation in the expansion of processed natural gas before the delivery of the latter to an acetylene production plant.

Processed natural gas is transported, as a rule with a pressure up to 70 bar, from conveying and processing plants via supply lines (long-distance lines) to gas suppliers and other major customers, such as in the chemical industry. Processed natural gas is understood in the context of the present invention to mean natural gas which can be used in the chemical industry without any further material processing steps. It serves, inter alia, as a basic material for the production of acetylene, which is an important initial compound in the large-scale production of chemical products. So that it can be used for acetylene production by oxidation, the processed natural gas has to be expanded to a pressure between 2 bar and 8 bar. This expansion usually takes place, according to the prior art, via regulating rails.

An alternative to expansion via regulating rails is afforded by expansion plants for pressurized gases which are known in principle from the prior art. Thus, EP 0 670 957 B1 discloses a natural gas expansion plant with a heat exchanger for the preheating of natural gas which is under high pressure, with a turbogenerator for expanding the natural gas to a lower pressure and for generating current from the energy in this case released, and with a power station which feeds its waste heat to the heat exchanger. The power station is composed of a plurality of engine-based cogeneration units composed in each case of a gas internal combustion engine and of a generator. In this case, the waste heat circuit of the engine-based cogeneration units is coupled thermally to an external energy consumer or energy generator in order to discharge the waste heat occurring, without external cooling measures, when the engine-based cogeneration units are operated digitally.

The problems of such expansion plants are, on the one hand, that the efficiency of turbogenerators (a type of high-speed synchronous generators) is limited and therefore energy recuperation is not very efficient, and, on the other hand, that an external power station is required in order to supply the heat exchangers of the plant for the purpose of heating the expanded gas. A large part of the energy which has been recuperated as a result of the expansion of the pressurized gas is consequently consumed again.

Against this background, the object of the invention is to utilize more efficiently the energy released during the expansion of the processed natural gas which is under high pressure and to recuperate energy in a sustained way.

This object is achieved, in a first aspect of the present invention, by means of a method for energy recuperation in the expansion of processed natural gas before the delivery of the latter to an acetylene production plant, which comprises the steps:

a) delivery of the processed natural gas from a processed natural gas supply line with a temperature of −10° C. to 50° C. and a pressure of 30 bar to 70 bar to a first heating stage and heating of the processed natural gas in the first heating stage to a temperature of 20° C. to 40° C., preferably 25° C. to 35° C.

b) delivery of the processed natural gas heated in the first heating stage to a second heating stage and heating of the processed natural gas in the second heating stage to a temperature of 70° C. to 140° C., preferably 75° C. to 85° C., c) delivery of the processed natural gas heated in the second heating stage to an expansion device and expansion of the processed natural gas in the expansion device to a pressure of 2 bar to 8 bar, the expansion device being a piston expansion machine which is operated by the expansion of the processed natural gas and generates energy.

A piston expansion machine in the context of the present invention is understood basically to mean a device in which pressurized gas is conducted into one or more cylinders and is expanded there, with the result that pistons provided in the cylinders are moved and mechanical work is performed as a result of the expansion. The expansion may in this case take place in one stage or in a plurality of stages.

The expansion of the processed natural gas in a piston expansion machine has, above all, the advantage of 15% to 20% higher efficiency, as compared with the turbogenerators used in the prior art. Even when it is taken into account that turbogenerators also require a lower outlay in maintenance terms, as compared with modern piston expansion machines, the method according to the invention still affords a marked increase in efficiency in comparison with the prior art.

In the method according to the invention, the processed natural gas, after its expansion in the piston expansion machine to a pressure of 2 bar to 8 bar, is delivered to an acetylene production plant. The present invention thus provides the first method by which processed natural gas can be expanded in an energy-efficient way for the chemical industry.

In order to relieve a heating stage which precedes acetylene production, it has proved advantageous, furthermore, in a step d), to deliver the processed natural gas expanded in the piston expansion machine to a pressure of 2 bar to 8 bar to a fourth heating stage and to heat the processed natural gas in the fourth heating stage to a temperature of 40° C. to 100° C. before the processed natural gas is delivered in step e) to the acetylene production plant.

The piston expansion machine operated by the expansion of the processed natural gas preferably drives a generator for generating electrical energy. The electrical energy thus generated can advantageously either be fed into the public power network or be stored in suitable storage devices inside the plant or be delivered directly to other consumers of the industrial plant.

In a specific embodiment of the method, the expansion of the processed natural gas comprises the steps:

c1) expansion of the processed natural gas (P), heated in the second heating stage (WT2), of a first expansion stage (E1) of the piston expansion machine (E) to a pressure of 15 bar to 25 bar, preferably 19 bar to 22 bar, the processed natural gas (P) having a temperature of 15° C. to 25° C. after the expansion in the first expansion stage (E1), c2) heating of the processed natural gas (P), expanded in the first expansion stage (E1), in a third heating stage (WT3) to a temperature of 70° C. to 140° C., and c3) expansion of the heated processed natural gas (P) in a second expansion stage (E2) of the piston expansion machine (E) to a pressure of 2 bar to 8 bar, preferably 4 bar to 6 bar, the processed natural gas (P) having a temperature of 10° C. to 100° C. after the expansion in the second expansion stage (E2).

The two-stage or multistage expansion of the processed natural gas with intermediate heating serves for more effective method management and more efficient energy balance, since the processed natural gas cooled after the first expansion stage has to be reheated only moderately in order, after the second expansion stage, to have a temperature suitable for the transfer of the expanded processed natural gas. Moreover, as a result of the two-stage or multistage expansion to temperatures of the order of the ambient temperature, adverse effects, such as condensation inside the plant, are avoided.

The heating of the processed natural gas may take place, in one or more of the first, second, third and fourth heating stages, by means of plate heat exchangers which are distinguished by an especially positive ratio of surface to heat to be exchanged.

Plate heat exchangers in the context of the present invention are heat exchangers with a special form of construction which are constructed from heat-conducting plates such that the medium to be heated and the heating medium in each case flow alternately in the successive interspaces. The plate set-up is sealed off outwardly and between the two media. In this case, the individual plates may be suitably profiled in order to allow optimal heat transfer.

The waste heat of the generator and/or of the piston expansion machine may be utilized at least partially for heating the processed natural gas in the first heating stage. The waste heat of the acetylene production plant may be utilized at least partially for heating the processed natural gas in the second and/or the third heating stage. The waste heat of the second heating stage and/or of the third heating stage may be utilized at least partially for heating the processed natural gas in the fourth heating stage.

By logically utilizing the waste heat occurring or present in the plant for the purpose of heating the processed natural gas, a power station, such as is described in the prior art, becomes unnecessary. Utilizing the waste heat inside the plant has the further advantage that, as compared with conventional plants, no additional cooling devices have to be provided.

The abovementioned object is achieved, in a second aspect of the invention, by means of a plant for energy recuperation in the expansion of processed natural gas, which is connected via one or more lines to an acetylene production plant, so as to provide a plant which has not been known hitherto in the prior art and is integrated from processed gas expansion and acetylene production and which is distinguished by high energy efficiency, and comprises a first heating stage for heating the processed natural gas, which heating stage is connected via a feed line to a processed natural gas supply line, a second heating stage for heating the processed natural gas, which heating stage is connected via a line to the first heating stage, and an expansion device for expanding the processed natural gas, which expansion device is connected via a line to the second heating stage.

The plant is distinguished in that the expansion device is a piston expansion machine for generating energy which has 15% to 20% higher efficiency as compared with turbogenerators used conventionally.

This advantage is preserved even though a modern piston expansion machine requires a higher outlay in terms of maintenance than a turbogenerator. Allowing for this fact, nevertheless, there is a marked increase in efficiency in comparison with a turbogenerator.

In a development of the plant, a fourth heating stage for heating the expanded processed natural gas is arranged between the piston expansion machine and the acetylene production plant and is connected via a line to the piston expansion machine and via a line to the acetylene production plant, so that the heating stages to be provided for preheating the processed natural gas for the acetylene production can have smaller and therefore more economical dimensioning or require less energy.

In order to make the energy recuperated in the expansion of the processed natural gas utilizable efficiently, the piston expansion machine is preferably connected to a generator for generating electrical energy. This generator may be connected, in turn, to the public power network, to suitable storage devices inside the plant or to consumers within the industrial plant.

It has proved advantageous if the piston expansion machine is of at least two-stage design, a third heating stage for heating the partially expanded processed natural gas being arranged between a first expansion stage for expanding the processed natural gas and a second expansion stage for expanding the partially expanded processed natural gas, so that the third heating stage in the piston expansion machine and the fourth heating stage upstream of the acetylene production plant can have a lower rating and no equipment has to be used as a precaution against, for example, the formation of condensate in the plant.

Preferably, one or more of the first, second, third and fourth heating stages are designed as plate heat exchangers, which operate more efficiently and can be arranged within the plant in a more space-saving way than other heat exchanger types.

In a specific embodiment, the first heating stage is connected via a waste heat line to the generator and/or the piston expansion machine. Furthermore, the second heating stage may be connected via a waste heat line to the acetylene production plant. It is preferable, moreover, if the third heating stage is connected via a waste heat line to the acetylene production plant. The fourth heating stage may be connected via waste heat lines to the second heating stage and the third heating stage.

By virtue of the system according to the invention of connecting heat-generating and heat-consuming plant parts to one another, the need for additional cooling and heating assemblies can be dispensed with the result of which, inter alia, is that the overall plant can have a more compact design and investment costs are lower.

Further features, advantages and possibilities for use may be gathered from the following description of a preferred exemplary embodiment, which, however, does not restrict the invention, with reference to the FIGURE. In this case, all the features described and/or illustrated pictorially constitute in themselves or in any desired combination the subject of the invention, also independently of their summary in the claims or their back reference.

The single FIGURE shows a method diagram for energy recuperation in the expansion of processed natural gas.

In the method according to the invention, the expansion of the processed natural gas P is carried out via a piston expansion machine E, instead of via a conventional regulating rail, the pressure expansion being utilized for performing in the piston expansion machine E mechanical work which in turn generates electrical current with the aid of a generator G.

According to the First Law of Thermodynamics, the energy which is extracted from a gas during expansion in the form of mechanical work has to be returned to it in the form of heat in order to bring the gas to its initial temperature again after expansion.

As may be gathered from the method diagram of FIG. 1, the processed natural gas P is delivered from a supply line, not illustrated in the FIGURE, with a pressure of up to 70 bar to the plant via a feed line Z, and, depending on the transport distance, the supply pressure may be reduced to 40 bar. The processed natural gas P has a temperature of between 0° C. and 25° C., depending on pressure, supply length and outside temperature.

In a first heating stage WT1, the processed natural gas P is heated to a temperature in the range of 20° C. to 35° C. before it is delivered via a line L1 to a second heating stage WT2 and heated there further to a temperature in the range of 70° C. to 85° C.

Plate heat exchangers are preferably used as heating stages WT1, WT2.

The processed natural gas P, which is heated in the heating stages WT1, WT2 and is under a pressure of up to 70 bar, is then delivered via a line L2 to the piston expansion machine E. In the embodiment described, this is a piston engine of the company Spilling, the piston engines of which are predominantly known in the prior art as ships' diesel engines and which have not yet been used hitherto as piston expansion machines for large-scale use in plants for the production of acetylene.

Via a pulsation damper, not illustrated in the FIGURE, the processed natural gas P is apportioned to six cylinders of a first expansion stage E1 of the Spilling piston engine, the cylinders being filled with the processed natural gas P via associated control slides. During expansion, the processed natural gas P drives a double-acting piston of the Spilling piston engine. The control slides and therefore the degree of filling of the cylinders are set by pressure regulation at the outlet of the first expansion stage E1.

After the first expansion stage E1, the processed natural gas P emerges with a pressure of approximately 20 bar and a temperature of 15° C. to 25° C. via a pulsation damper and is delivered via a line L3 to a third heating stage WT3 where it is heated to a temperature in the range of between 70° C. and 85° C. before it is delivered via a line L4 to a second expansion stage E2.

In the second expansion stage E2, in a similar way to the first expansion stage E1, the processed natural gas P is again apportioned to six cylinders via a pulsation damper. Here, too, associated control slides are set by pressure regulation at the outlet of the second expansion stage E2.

The processed natural gas P emerges from the second expansion stage E2 with pressure 4 bar to 6 bar and a temperature of between 10° C. and 25° C. via a further pulsation damper and is delivered via a line L5 to a fourth heating stage WT4 where it is heated to 40° C. to 50° C. in order to relieve a heating stage (not illustrated in this FIGURE) which precedes the acetylene production H.

The piston expansion machine E, that is to say, here, the Spilling piston engine, drives preferably at a maximum of 1000 U/min a generator G for current generation. The generated current may, for example, be utilized in the acetylene plant itself or be made available in other plants.

The embodiment according to the invention is distinguished, furthermore, by an interconnected heat system which is described below.

For the heating of the processed natural gas P extracted from the supply line via the feed line Z, in the first heating stage WT1 the waste heat of the generator G is utilized via a heat circuit A1 and the waste heat of the oil cooling system employed for cooling the Spilling piston engine E is utilized via a further heat circuit, not illustrated in the FIGURE.

In the second heating stage WT2, condensate KP from the acetylene production plant H is utilized for heating the processed natural gas P via a waste heat line A2 and is supplemented, as required, by condensate KN from an internal network of the industrial plant. The condensate KP, KN has a temperature of 95° C. to 105° C. and is cooled in the second heating stage WT2.

Likewise, in the third heating stage WT3, condensate KP with a temperature of 95° C. to 105° C. from the acetylene production plant H and, optionally, condensate KN from the internal network of the industrial plant are utilized via a waste heat line A3 in order to heat the processed natural gas P emerging from the first expansion stage E1 to 70° C. to 85° C.

The heating, already described above, of the processed natural gas P expanded to 4 bar to 8 bar in the fourth heating stage WT4 takes place via waste heat lines A4, A5 with the condensate KP, KN, which has already been cooled in the heating stages WT2 and WT3. In these heating stages, the condensate KP, KN is cooled further and is subsequently delivered to the plant AW for utilizing the waste heat in the acetylene plant H. The condensate thus cooled is used for the condensation of low-pressure steam present in the plant, with the result that the use of cold, fully deionized water $H_2O$ can be reduced. The condensate reheated in the plant AW is delivered again to the condensate process via a waste heat line A7.

By virtue of the embodiment according to the invention, the saving of fully deionized water $H_2O$ may amount to up to 370.000 t per year, while at the same time up to 8800 t per year of steam can be saved. In addition, in the acetylene production plant H, due to the higher temperature level of the processed natural gas in the line L6, 730 000 $Nm^3$ per year of heating natural gas can be saved for the required heating of the processed natural gas to process temperature.

LIST OF REFERENCE SYMBOLS

A1 Heat circuit
A2, A3, A4, A5, A6, A7 Waste heat lines
E Expansion device (piston expansion machine)
E1 First expansion stage
E2 Second expansion stage
AW Plant for utilizing the waste heat
G Generator
H Acetylene production plant
KN Condensate (network)
KP Condensate (process)
L1, L2, L3, L4, L5, L6 Lines
P Processed natural gas
S Power network
WT1 First heating stage
WT2 Second heating stage
WT3 Third heating stage
WT4 Fourth heating stage

The invention claimed is:

1. A method for energy recuperation in the expansion of processed natural gas during delivery to an acetylene production plant, comprising:
   a) delivering a processed natural gas from a processed natural gas supply line, wherein the processed natural gas has a temperature of −10° C. to 50° C. and a pressure of 30 bar to 70 bar, to a first heating stage and heating the processed natural gas in the first heating stage to a temperature of 20° C. to 40° C.,
   b) delivering the processed natural gas heated in the first heating stage to a second heating stage and heating the processed natural gas in the second heating stage to a temperature of 70° C. to 140° C., c1) delivering the processed natural gas heated in the second heating stage to a first expansion stage of a piston expansion machine, wherein the piston expansion machine operates by the expansion of the processed natural gas and which generates energy, and expanding the processed natural gas in the first expansion stage to a pressure of 15 bar to 25 bar, wherein the processed natural gas has a temperature of 15° C. to 25° C. after the expansion in the first expansion stage, c2) delivering the processed natural gas expanded in the first expansion stage to a third heating stage and heating the processed natural gas in the third heating stage to a temperature of 70° C. to 140° C., c3) delivering the processed natural gas heated in the third heating stage to a second expansion stage of the piston expansion machine and expanding the processed natural gas in the second expansion stage of the piston expansion machine to a pressure of 2 bar to 8 bar, wherein the processed natural gas has a temperature of 10° C. to 100° C. after the expansion in the second expansion stage, d) delivering the processed natural gas expanded in the second expansion stage of the piston expansion machine to a fourth heating stage and heating the processed natural gas in the fourth heating stage to a temperature of 40° C. to 100° C., wherein the processes natural gas has a pressure of 2 bar to 8 bar after the heating in the fourth heating stage, and e) delivering the processed natural gas having a pressure of 2 bar to 8 bar heated in the fourth heating stage to an acetylene production plant, wherein at least a portion of waste heat from the second heating stage and the third heating stage heats the processed natural gas in the fourth heating stage.

2. The method according to claim 1, wherein the piston expansion machine operates by the expansion of the processed natural gas driving a generator that generates electrical energy.

3. The method according to claim 1, wherein the heating of the processed natural gas in at least one stage selected from the group consisting of the first heating stage, the second heating stage, the third heating stage, and the fourth heating stage is performed in a plate heat exchanger.

4. The method according to claim 1, wherein the processed natural gas is heated to a temperature of 25° C. to 35° C. in the first heating stage.

5. The method according to claim 1, wherein the processed natural gas is heated to a temperature of 75° C. to 85° C. in the second heating stage.

6. The method according to claim 1, wherein the processed natural gas is expanded to a pressure of 19 bar to 22 bar in the first expansion stage.

7. The method according to claim 1, wherein the processed natural gas is expanded to a pressure of 4 bar to 6 bar in the second expansion stage.

8. The method according to claim 2, wherein at least a portion of waste heat from the generator heats the processed natural gas in the first heating stage.

9. The method according to claim 1, wherein the piston expansion machine is of at least two-stage design.

10. The method according to claim 1, wherein the piston expansion machine comprises a double-acting piston.

11. A plant for energy recuperation during the expansion of processed natural gas, comprising:
a processed natural gas supply line,
a first heating stage suitable for heating a processed natural gas, wherein the first heating stage is connected to the processed natural gas supply line via a feed line,
a second heating stage suitable for heating the processed natural gas heated by the first heating stage, wherein the second heating stage is connected to the first heating stage via a line,
a piston expansion machine suitable for expanding the processed natural gas heated by the second heating stage, and comprising a first expansion stage and a second expansion stage, wherein the piston expansion machine is connected to the second heating stage via a line,
a third heating stage between the first expansion stage and the second expansion stage, wherein the third heating stage is connected to the first expansion stage via a line and is connected to the second expansion stage via a line, and
a fourth heating stage suitable for heating the processed natural gas expanded in the second expansion stage of the piston expansion machine, wherein the fourth heating stage is connected to the second expansion stage via a line,
wherein
the second heating stage is connected to the fourth heating stage via a waste heat line,
the third heating stage is connected to the fourth heating stage via a waste heat line, and
the plant is connectable via one or more lines to an acetylene production plant.

12. The plant according to claim 11, wherein the piston expansion machine is connected to a generator configured for generating electrical energy.

13. The plant according to claim 11, wherein at least one stage selected from the group consisting of the first heating stage, the second heating stage, the third heating stage, and the fourth heating stage comprises a plate heat exchanger.

14. The plant according to claim 12, wherein:
(i) the first heating stage is connected via a waste heat line to the generator,
(ii) the second heating stage is connectable via a waste heat line to the acetylene production plant,
(iii) the third heating stage is connectable via a waste heat line to the acetylene production plant,
(iv) the fourth heating stage is connected via waste heat lines to the second heating stage and the third heating stage,
or any combination of (i), (ii), (iii) and (iv).

15. The plant according to claim 11, wherein the piston expansion machine is of at least two-stage design.

16. The plant according to claim 11, wherein the piston expansion machine comprises a double-acting piston.

* * * * *